United States Patent [19]

Dumbaugh, Jr.

[11] Patent Number: 4,634,684

[45] Date of Patent: Jan. 6, 1987

[54] STRONTIUM ALUMINOSILICATE GLASS SUBSTRATES FOR FLAT PANEL DISPLAY DEVICES

[75] Inventor: William H. Dumbaugh, Jr., Painted Post, N.Y.

[73] Assignee: Corning Glass Works, New York, N.Y.

[21] Appl. No.: 790,369

[22] Filed: Oct. 23, 1985

[51] Int. Cl.$^4$ .............................................. C03C 3/085
[52] U.S. Cl. ...................................................... 501/69
[58] Field of Search ........................................ 501/69

[56] References Cited

U.S. PATENT DOCUMENTS 3,962,117 8/1976 Reade ..................................... 501/69
4,180,618 12/1979 Alpha et al. .......................... 501/69

Primary Examiner—Mark L. Bell
Attorney, Agent, or Firm—C. S. Janes, Jr.

[57] ABSTRACT

This invention is concerned with the fabrication of flat panel display devices wherein a film of large crystal polysilicon is grown on a substrate. More particularly, the present invention is drawn to such devices wherein the substrate is prepared from a strontium aluminosilicate glass consisting essentially, in mole percent, of about 9–12% SrO, 9–12% $Al_2O_3$, and 77–82% $SiO_2$.

2 Claims, No Drawings

STRONTIUM ALUMINOSILICATE GLASS SUBSTRATES FOR FLAT PANEL DISPLAY DEVICES

BACKGROUND OF THE INVENTION

Two recent technological advances have made large, flat-panel display devices a distinct practical possibility: (1) the preparation of liquid crystals exhibiting improved characteristics; and (2) the production of a surface layer of fine-grained polysilicon.

The development of liquid crystals has progressed to the point where miniature color television receiver sets have been produced from them and much larger information display panels are technically possible. Liquid crystals inherently demonstrate slow responses to electrical signals and, therefore, a "switch" to rapidly respond to an electrical stimulus is required to set up an active matrix display. The thin film transistor (TFT) performs that function.

It is well-known that a TFT can be fabricated from single crystal silicon; however, by the very nature of single crystal silicon, there is a limitation on the size of a TFT that can be fashioned therefrom. It has been discovered that a fine-grained polysilicon layer which has been deposited onto a substrate can be recrystallized to large-grained polysilicon by scanning with a heat source such as a laser. It has been observed that a TFT prepared from large-grained polysilicon evidences only slight deterioration in electrical characteristics when compared with those displayed by a TFT fabricated from single crystal silicon, and operates very satisfactorily in multiplexing a liquid crystal display.

A large-grained polysilicon active matrix display requires a substrate which is transparent, flat, smooth, inert, compatible with silicon, in terms of thermal expansion, and capable of withstanding processing temperatures of at least 850° C. Accordingly, a glass will meet those requirements if it is free from alkali metal ions, it displays a linear coefficient of thermal expansion (25°–300° C.) of approximately $30-40 \times 10^{-7}/°C.$, and an annealing point of at least 850° C. and, preferably, greater than 875° C. In order to utilize the glass sheet forming method described in U.S. Pat. No. 3,338,696, the glass must exhibit a liquidus viscosity of at least 100,000 poises, preferably over 250,000 poises. Also, transparent, homogeneous glasses with annealing points in the vicinity of 900° C. are very difficult to obtain by melting batches at temperatures no higher than about 1800° C. 1800° C. represents the practical limit for melting materials in contact with platinum-rhodium and most refractories used in an oxidizing atmosphere. Finally, to permit glass forming to be carried out utilizing conventional equipment and techniques, a liquidus temperature of no more than about 1400° C. is highly preferred.

Therefore, the primary objective of the present invention is to prepare transparent, homogeneous glasses demonstrating a linear coefficient of thermal expansion (25°–300° C.) of about $30-40 \times 10^{-7}/°C.$, an annealing point of at least 850° C., a liquidus temperature no higher than about 1400° C., a liquidus viscosity of at least 100,000 poises, and which can be melted at temperatures not exceeding about 1800° C.

SUMMARY OF THE INVENTION

I have found that glasses satisfying that objective can be prepared from a narrow range of essentially alkali metal oxide-free glasses within the ternary $SrO—Al_2O_3—SiO_2$ system having compositions consisting essentially, expressed in terms of mole percent on the oxide basis, of about 9–12% SrO, 9–12% $Al_2O_3$, and 77–82% $SiO_2$. The limits of those components regimes are extremely critical. To illustrate, where the level of SrO is too high, the annealing point falls below the desired target and the linear coefficient of thermal expansion may be raised to an unacceptably high value. Conversely, when the SrO content is too low, the glass becomes very difficult to melt and/or the liquidus temperature is raised to an unacceptable level. $Al_2O_3$ concentrations lower than those specified lead to annealing points that are too low. $Al_2O_3$ contents greater than those specified result in undesirably high liquidus temperatures. When the amount of $SiO_2$ exceeds the prescribed maximum, the glasses become too difficult to melt; at $SiO_2$ levels below the stated minimum, either the annealing point becomes too low or the liquidus temperature becomes too high.

Whereas a precise conversion of composition ranges expressed in mole percent to ranges in weight percent is not possible, an approximation of the ternary system expressed in weight percent comprises about 13–18% SrO, 13–18% $Al_2O_3$, and 66–72% $SiO_2$.

Minor substitutions of MgO, CaO, ZnO, $La_2O_3$, and MnO for SrO in the ternary system undesirably affect the linear coefficient of expansion and/or the annealing point and/or the liquidus temperature of the glass. Therefore, only very small additions of those materials can be tolerated when the desired glass properties are to be maintained. Strong fluxes such as the alkali metal oxides will desirably be essentially absent.

The substitution of BaO for part of the SrO causes a slight rise in the linear coefficient of expansion and has the very desirable capability of reducing the liquidus temperature without adversely affecting the viscosity of the glass to any substantial extent. Hence, the substitution of BaO for SrO does not alter the annealing point appreciably. That capability of BaO is of practical significance in that, by balancing the SrO and BaO concentrations, the coefficient of thermal expansion can be varied and carefully controlled. Whereas substitutions of BaO for SrO up to 8 mole percent, preferably no more than about 6 mole percent, can be useful, volatilization of BaO is a recognized problem when melting temperatures of 1800° C. are employed. SrO is much less subject to volatilization at 1800° C.

Furthermore, and even more importantly from the standpoint of glass melting, the inclusion of large amounts of BaO leads to the development of seeds in the glass. For example, where BaO is substituted in total for SrO, it is virtually impossible to produce at melting temperatures no higher than 1800° C. a glass containing no more than a few seeds. In contrast, laboratory experience has demonstrated that essentially seed-free glasses can be prepared from glasses within the above-described ranges of the ternary system $SrO—Al_2O_3—SiO_2$. Accordingly, whereas the incorporation of BaO can impart useful properties to the glass, its presence can lead to environment polluting volatilization and renders the glass more difficult to melt to good quality.

PRIOR ART

Kh. Sh. Iskhakov, "Region of Glass Formation in a Strontium Oxide-Aluminum Oxide-Silicon Dioxide System", *Uzb. Khim. Zh.* 15 [1], 10–12 (1971) describes the preparation of glasses composed, in mole percent, of 25–60% SrO, 5–30% Al$_2$O$_3$, and 35–65% SiO$_2$ by melting at 1500°–1550° C. for 1–1.5 hours. The SrO contents are quite apparently far removed from those of the present invention.

Kh. Sh. Iskhakov, "Properties of Glasses in the Strontia-Alumina-Silica System", *Uzb. Khim. Zh.*, 15 [2], 79–81 (1971) discusses several physical properties determined on glasses having compositions within the ranges of the above Iskhakov literature reference. It was observed that the glasses manifested coefficients of thermal expansion of 64–97×10$^{-7}$/°C. It was stated that as the SrO content is raised, the coefficient of thermal expansion rises.

G. I. Zhuravlev, A. I. Kuznetsov, T. I. Semenova, and N. G. Suikovskaya, *Glass,* USSR SU870,365, Jan. 7, 1984, discloses the preparation of glasses demonstrating higher softening points and special electrical resistivities containing, in weight percent, 25–35% SrO, 11–20% Al$_2$O$_3$, and 41–63% SiO$_2$. The SrO and SiO$_2$ levels are generally higher and lower, respectively, when compared with their concentrations in the present inventive glasses.

G. I. Zhuravlev, V. A. Malov, A. I. Kuznetsov, and T. I. Draunina, "Application of Dispersed Glass of Silicon Dioxide-Aluminum Oxide-Strontium Oxide System on a Niobium Substrate by Electrophoretic Deposition", *Zh. Prikl. Khim.* (Leningrad) 54 [7] 1601–4 (1981) describes the application of a protective electric insulating coating on niobium parts of high pressure lamps through electrophoretic deposition of glass having a composition within the ranges disclosed in the above Zhuravlev et al. literature reference.

U.S. Pat. No. 4,180,618 reports the fabrication of electronic devices comprises of a thin film of silicon deposited upon a substrate, wherein the substrate is composed of a glass consisting essentially, in weight percent, of 55–75% SiO$_2$, 5–25% Al$_2$O$_3$, and at least one alkaline earth oxide selected from the group in the indicated proportions of 9–15% CaO, 14–20% SrO, and 18–26% BaO. The CaO and BaO contents are higher than can be tolerated in the present inventive glasses. Whereas the broad ranges of SrO, Al$_2$O$_3$, and SiO$_2$ overlap those of the inventive glasses, there is no recognition of the matrix of superior properties which can be secured from compositions coming within the narrowly circumscribed ranges of the present invention; nor is there a working example provided which falls within the limits of the present inventive glasses.

RELATED APPLICATION

U.S. application Ser. No. 790,370, filed concurrently herewith by me under the title BARIUM AND/OR STRONTIUM ALUMINOSILICATE CRYSTAL-CONTAINING GLASSES FOR FLAT PANEL DISPLAY DEVICES, discloses glasses within a narrow range of glasses within the BaO and/or SrO—Al$_2$O$_3$—SiO$_2$ system, viz., glasses consisting essentially, in mole percent on the oxide basis, of about 2–6% BaO and/or SrO, 18–26% Al$_2$O$_3$, and 68–80% SiO$_2$, which, when heat treated, are subject to the growth in situ of extremely fine-grained crystals. The resultant products exhibit annealing points in excess of 900° C.

DESCRIPTION OF PREFERRED EMBODIMENTS

Table I records a number of glass compositions, expressed in terms of mole percent on the oxide basis, illustrating the parameters of the instant invention. The actual batch ingredients can comprise any materials, either the oxides or other compounds, which, when melted together, will be converted into the desired oxides in the proper proportions. In the laboratory work described below, the batch materials consisted of high purity sand, Al$_2$O$_3$, SrCO$_3$, BaCO$_3$, MgO, CaO, ZnO, MnO, and La$_2$O$_3$.

The batch materials were compounded, ballmilled to assist in achieving a homogeneous melt, and charged into platinum or platinum-rhodium crucibles. Those batches containing 77% SiO$_2$ and less could be melted at 1600°–1650° C. for 4–16 hours in an electrically-heated furnace. The batches of higher SiO$_2$ contents were melted at 1700°–1800° C. for 16 hours in a gas-oxygen fired furnace. In each case, the melts were cast into an iron mold to form circularly-shaped slabs having a diameter of about 12″ and a thickness of about 0.75″, and those slabs immediately transferred to an annealer. Table IA reports the compositions of Table I in terms of weight percent on the oxide basis.

TABLE I

| | 1 | 2 | 3 | 4 | 5 | 6 |
|---|---|---|---|---|---|---|
| SiO$_2$ | 80 | 80 | 80 | 80 | 80 | 80 |
| Al$_2$O$_3$ | 10 | 10 | 10 | 10 | 10 | 10 |
| SrO | 10 | 8 | 6 | 8 | 6 | 4 |
| MgO | — | 2 | 4 | — | — | — |
| CaO | — | — | — | 2 | 4 | — |
| BaO | — | — | — | — | — | 6 |

| | 7 | 8 | 9 | 10 | 11 | 12 |
|---|---|---|---|---|---|---|
| SiO$_2$ | 80 | 80 | 80 | 80 | 80 | 80 |
| Al$_2$O$_3$ | 10 | 10 | 10 | 10 | 10 | 10 |
| SrO | 8 | 6 | 8 | 6 | 8 | 6 |
| ZnO | 2 | 4 | — | — | — | — |
| LaO$_{1.5}$ | — | — | 2 | 4 | — | — |
| MnO | — | — | — | — | 2 | 4 |

| | 13 | 14 | 15 | 16 | 17 | 18 |
|---|---|---|---|---|---|---|
| SiO$_2$ | 80 | 80 | 80 | 80 | 80 | 79 |
| Al$_2$O$_3$ | 10 | 10 | 10 | 10 | 10 | 10 |
| SrO | 8 | 6 | 5 | 4 | — | 11 |
| BaO + CaO | 2 | 4 | 5 | 6 | 10 | — |

| | 19 | 20 | 21 | 22 | 23 | 24 |
|---|---|---|---|---|---|---|
| SiO$_2$ | 77 | 77 | 77 | 75 | 75 | 75 |
| Al$_2$O$_3$ | 8 | 10 | 12 | 8 | 10 | 12 |
| SrO | 15 | 13 | 11 | 17 | 15 | 13 |

| | 25 | 26 | 27 | 28 | 29 | 30 |
|---|---|---|---|---|---|---|
| SiO$_2$ | 73 | 73 | 73 | 70 | 71 | 80 |
| Al$_2$O$_3$ | 8 | 10 | 12 | 15 | 12 | 7 |
| SrO | 19 | 17 | 15 | 15 | 17 | 13 |

| | 31 | 32 | 33 | 34 | 35 | 36 |
|---|---|---|---|---|---|---|
| SiO$_2$ | 78 | 76 | 80 | 79 | 78 | 77 |
| Al$_2$O$_3$ | 9 | 11 | 8 | 9 | 10 | 11 |
| SrO | 13 | 13 | 12 | 12 | 12 | 12 |

| | 37 | 38 | 39 | 40 | 41 | 42 |
|---|---|---|---|---|---|---|
| SiO$_2$ | 82 | 81 | 80 | 78 | 82 | 81 |
| Al$_2$O$_3$ | 7 | 8 | 9 | 10 | 8 | 9 |
| SrO | 11 | 11 | 11 | 11 | 10 | 10 |

| | 43 | 44 | 45 | 46 | 47 | 48 |
|---|---|---|---|---|---|---|
| SiO$_2$ | 79 | 78 | 77 | 83 | 82 | 81 |
| Al$_2$O$_3$ | 11 | 12 | 13 | 8 | 9 | 10 |
| SrO | 10 | 10 | 10 | 9 | 9 | 9 |

| | 49 | 50 | 51 | 52 | 53 | 54 |
|---|---|---|---|---|---|---|
| SiO$_2$ | 80 | 79 | 78 | 84 | 83 | 82 |

TABLE I-continued

|  | | | | | | |
|---|---|---|---|---|---|---|
| Al$_2$O$_3$ | 11 | 12 | 13 | 8 | 9 | 10 |
| SrO | 9 | 9 | 9 | 8 | 8 | 8 |

|  | 55 | 56 | 57 |
|---|---|---|---|
| SiO$_2$ | 83 | 80 | 80 |
| Al$_2$O$_3$ | 10 | 10 | 10 |
| SrO | 7 | 3 | 2 |
| BaO | — | 7 | 8 |

TABLE IA

|  | 1 | 2 | 3 | 4 | 5 | 6 |
|---|---|---|---|---|---|---|
| SiO$_2$ | 70 | 71.3 | 72.7 | 71.0 | 72.0 | 67.1 |
| Al$_2$O$_3$ | 14.9 | 15.2 | 15.4 | 15.1 | 15.3 | 14.3 |
| SrO | 15.1 | 12.3 | 9.4 | 12.3 | 9.3 | 5.8 |
| MgO | — | 1.2 | 2.5 | — | — | — |
| CaO | — | — | — | 1.6 | 3.4 | — |
| BaO | — | — | — | — | — | 12.8 |

|  | 7 | 8 | 9 | 10 | 11 | 12 |
|---|---|---|---|---|---|---|
| SiO$_2$ | 70.5 | 70.9 | 70.5 | 71.1 | 70.7 | 71.4 |
| Al$_2$O$_3$ | 15.0 | 15.1 | 15.0 | 15.1 | 15.0 | 15.2 |
| SrO | 12.2 | 9.2 | 12.2 | 9.2 | 12.2 | 9.2 |
| ZnO | 2.3 | 4.8 | — | — | — | — |
| LaO$_{1.5}$ | — | — | 2.3 | 4.6 | — | — |
| MnO | — | — | — | — | 2.1 | 4.2 |

|  | 13 | 14 | 15 | 16 | 17 | 18 |
|---|---|---|---|---|---|---|
| SiO$_2$ | 69.0 | 68.0 | 67.6 | 69.9 | 65.3 | 68.7 |
| Al$_2$O$_3$ | 14.7 | 14.5 | 14.3 | 14.9 | 13.9 | 14.8 |
| SrO | 11.9 | 8.8 | 7.3 | 6.0 | — | 16.5 |
| BaO + CaO | 4.4 | 8.7 | 10.8 | 9.2 | 20.8 | — |

|  | 19 | 20 | 21 | 22 | 23 | 24 |
|---|---|---|---|---|---|---|
| SiO$_2$ | 66.1 | 66.1 | 66.3 | 63.6 | 63.6 | 63.8 |
| Al$_2$O$_3$ | 11.7 | 14.6 | 17.3 | 11.5 | 14.4 | 17.1 |
| SrO | 22.2 | 19.3 | 16.4 | 24.9 | 22.0 | 19.1 |

|  | 25 | 26 | 27 | 28 | 29 | 30 |
|---|---|---|---|---|---|---|
| SiO$_2$ | 61.1 | 61.2 | 61.4 | 57.8 | 58.9 | 70.0 |
| Al$_2$O$_3$ | 11.4 | 14.2 | 16.8 | 20.8 | 16.7 | 10.4 |
| SrO | 27.5 | 24.6 | 21.8 | 21.4 | 24.4 | 19.6 |

|  | 31 | 32 | 33 | 34 | 35 | 36 |
|---|---|---|---|---|---|---|
| SiO$_2$ | 67.4 | 64.9 | 70.1 | 68.8 | 67.5 | 66.2 |
| Al$_2$O$_3$ | 13.2 | 15.9 | 11.9 | 13.3 | 14.7 | 16.1 |
| SrO | 19.4 | 19.2 | 18.0 | 17.9 | 17.8 | 17.7 |

|  | 37 | 38 | 39 | 40 | 41 | 42 |
|---|---|---|---|---|---|---|
| SiO$_2$ | 72.6 | 71.3 | 70.0 | 68.4 | 72.7 | 71.3 |
| Al$_2$O$_3$ | 10.5 | 12.0 | 13.4 | 14.9 | 12.0 | 13.5 |
| SrO | 16.9 | 16.7 | 16.6 | 16.7 | 15.3 | 15.2 |

|  | 43 | 44 | 45 | 46 | 47 | 48 |
|---|---|---|---|---|---|---|
| SiO$_2$ | 68.7 | 67.6 | 66.3 | 74.0 | 72.6 | 71.3 |
| Al$_2$O$_3$ | 16.3 | 17.4 | 18.8 | 12.1 | 13.6 | 15.0 |
| SrO | 15.0 | 15.0 | 14.9 | 13.9 | 13.8 | 13.7 |

|  | 49 | 50 | 51 | 52 | 53 | 54 |
|---|---|---|---|---|---|---|
| SiO$_2$ | 70.0 | 68.9 | 67.6 | 75.4 | 74.0 | 72.7 |
| Al$_2$O$_3$ | 16.4 | 17.5 | 18.9 | 12.2 | 13.7 | 15.1 |
| SrO | 13.6 | 13.6 | 13.5 | 12.4 | 12.3 | 12.2 |

|  | 55 | 56 | 57 |
|---|---|---|---|
| SiO$_2$ | 74.0 | 66.7 | 66.2 |
| Al$_2$O$_3$ | 15.2 | 14.1 | 14.0 |
| SrO | 10.8 | 4.3 | 2.9 |
| BaO | — | 14.9 | 16.9 |

Table II records a number of physical properties measured on the above glasses. The annealing point (Ann. Pt.) and strain point (Str. Pt.) in terms of °C. were determined in accordance with the beam bending method described in ASTM C598; the linear coefficient of thermal expansion (Coef. Exp.) in terms of ×10$^{-7}$/°C. over the range of 25°–300° C. was ascertained in accordance with ASTM E228 utilizing a fused silica dilatometer; the internal liquidus temperature (Liquidus) in terms of °C. was determined by placing the glass in a platinum boat, introducing the boat into a furnace having a temperature gradient spanning the liquidus temperature, and maintaining the boat in that furnace for 24 hours; the viscosity of the glass at the liquidus (Liq. Vis.) in terms of 10$^5$ poises was delineated by using a rotational viscometer while cooling the glass at 2° C./minute; the D.C. resistivity (Log $\rho$ at 250° C. and 350° C.) in terms of ohm-cm, dielectric constant (Die. Con.) at ambient temperatures and 1 KHz, and the loss tangent (Loss Tan.) at ambient temperature and 1 KHz were defined following the techniques set out in ASTM D150, D257, and C657; and the chemical durability of the glass upon individual exposures to 5% aqueous HCl for 24 hours, to 5% aqueous NaOH for 6 hours, and to 0.02N aqueous Na$_2$CO$_3$ for 6 hours, each exposure being made at 95° C. and each loss being reported in terms of mg/cm$^2$, was ascertained on polished plates of glass both in terms of visual appearance (Appear.) and in terms of weight loss (Wt. Loss). With respect to appearance, N.C. indicates no change, S. Frost means slight frosting, and S. Haze reflects slight haze.

Glasses 19–28 were melted for 16 hours at 1650° C. in an electrically-fired furnace. Glasses 25 and 26 were clear, viscous, and free from seeds; glasses 20, 22, and 24 were clear, but quite seedy; and the remainder of the glasses contained some seeds and were clear. The rest of the exemplary compositions were melted in a gas-oxygen furnace for 16 hours at 1800° C. At SiO$_2$ levels up to 81 mole percent, the glasses were clear, viscous, and free from seeds. At a concentration of 82 mole percent SiO$_2$, the glasses were clear, extremely viscous, and surprisingly, free from seeds. At a content of 83 mole percent SiO$_2$, the glasses appeared to be clear, but so viscous that they barely moved, and contained some seeds.

TABLE II

|  | 1 | 2 | 3 | 4 | 5 | 6 |
|---|---|---|---|---|---|---|
| Ann. Pt. | 892 | 863 | 848 | 880 | 871 | 888 |
| Str. Pt. | 839 | 848 | 791 | 822 | 812 | 827 |
| Coef. Exp. | 36.2 | 31.9 | 27.8 | 34.0 | 33.9 | 36.9 |
| Liquidus | 1363 | 1408 | 1427 | 1428 | 1446 | 1319 |
| Liq. Vis. | 1.1 | — | — | — | — | 14 |
| Log $\rho$ | | | | | | |
| 250 | 12.74 | — | — | — | — | 11.97 |
| 350 | 10.76 | — | — | — | — | 10.09 |
| Die. Con. | 5.43 | — | — | — | — | 6.00 |
| Loss Tan. | — | — | — | — | — | 0.0022 |
| 5% HCl | | | | | | |
| Appear. | N.C. | — | — | — | — | N.C. |
| Wt. Loss | 0.02 | — | — | — | — | 0.01 |
| 5% NaOH | | | | | | |
| Appear. | S. Haze | — | — | — | — | S. Frost |
| Wt. Loss | 1.2 | — | — | — | — | 1.3 |
| 0.02N Na$_2$CO$_3$ | | | | | | |
| Appear. | N.C. | — | — | — | — | S. Haze |
| Wt. Loss | 0.02 | — | — | — | — | 0.02 |

|  | 7 | 8 | 9 | 10 | 11 | 12 |
|---|---|---|---|---|---|---|
| Ann. Pt. | 846 | 821 | 870 | 861 | 857 | 841 |
| Str. Pt. | 789 | 763 | 811 | 804 | 799 | 785 |
| Coef. Exp. | 30.2 | 26.5 | 33.3 | 32.0 | 31.7 | 27.8 |
| Liquidus | 1408 | 1443 | 1418 | 1436 | 1486 | 1417 |

|  | 13 | 14 | 15 | 16 | 17 | 18 |
|---|---|---|---|---|---|---|
| Ann. Pt. | 888 | 890 | 880 | 871 | 873 | 884 |
| Str. Pt. | 829 | 828 | 816 | 811 | 810 | 826 |
| Coef. Exp. | 36.6 | 36.0 | 37.2 | 34.5 | 39.3 | 38 |
| Liquidus | 1414 | 1387 | 1375 | 1399 | 1336 | 1365 |

|  | 19 | 20 | 21 | 22 | 23 | 24 |
|---|---|---|---|---|---|---|
| Ann. Pt. | 809 | 848 | 901 | 794 | 829 | 880 |

TABLE II-continued

|  | 19 | 20 | 21 | 22 | 23 | 24 |
|---|---|---|---|---|---|---|
| Str. Pt. | 755 | 790 | 837 | 743 | 769 | 820 |
| Coef. Exp. | 45.1 | 41.2 | 37.0 | 48.3 | 44.3 | 41.2 |
| Liquidus | 1320 | 1346 | 1375 | 1301 | 1313 | 1426 |

|  | 25 | 26 | 27 | 28 | 29 | 30 |
|---|---|---|---|---|---|---|
| Ann. Pt. | 785 | 807 | 849 | 885 | 820 | 811 |
| Str. Pt. | 736 | 750 | 797 | 832 | 772 | 758 |
| Coef. Exp. | 51.6 | 48.0 | 44.1 | 43.9 | 48.3 | 38.1 |
| Liquidus | 1209 | 1289 | 1433 | 1573 | 1421 | 1441 |

|  | 31 | 32 | 33 | 34 | 35 | 36 |
|---|---|---|---|---|---|---|
| Ann. Pt. | 865 | — | 834 | 893 | 855 | — |
| Str. Pt. | 804 | — | 778 | 832 | 796 | 798 |
| Coef. Exp. | 37.0 | 39.5 | 38.4 | 35.3 | 38.6 | 41.2 |
| Liquidus | 1369 | 1418 | 1408 | 1382 | 1359 | 1411 |

|  | 37 | 38 | 39 | 40 | 41 | 42 |
|---|---|---|---|---|---|---|
| Ann. Pt. | 843 | 863 | 869 | 884 | 857 | 896 |
| Str. Pt. | 781 | 800 | 809 | 822 | 798 | 824 |
| Coef. Exp. | 36.1 | 35.4 | 36.4 | 37.1 | 35.5 | 33.7 |
| Liquidus | 1486 | 1457 | 1384 | 1423 | 1427 | 1400 |

|  | 43 | 44 | 45 | 46 | 47 | 48 |
|---|---|---|---|---|---|---|
| Ann. Pt. | 856 | 889 | 877 | 904 | 900 | 896 |
| Str. Pt. | 803 | 831 | 818 | 841 | 839 | 834 |
| Coef. Exp. | 40.4 | 33.1 | 31.6 | 30.4 | 34.1 | 32.1 |
| Liquidus | 1387 | 1390 | 1446 | 1457 | 1461 | 1445 |

|  | 49 | 50 | 51 | 52 | 53 | 54 |
|---|---|---|---|---|---|---|
| Ann. Pt. | 893 | — | 884 | 908 | 907 | 901 |
| Str. Pt. | 834 | 827 | 826 | 846 | 846 | 838 |
| Coef. Exp. | — | 31.8 | 30.4 | 29.4 | 27.4 | 31.3 |
| Liquidus | 1381 | — | 1487 | 1436 | 1460 | 1461 |

|  | 55 | 56 | 57 |
|---|---|---|---|
| Ann. Pt. | 897 | 887 | 885 |
| Str. Pt. | 835 | 824 | 822 |
| Coef. Exp. | 27.1 | 38.0 | 38.0 |
| Liquidus | 1450 | 1315 | 1342 |

A conjunctional study of Tables I and II clearly illustrates the criticality of maintaining the SrO, Al$_2$O$_3$, and SiO$_2$ concentrations within the prescribed ranges of the ternary system to prepare glasses capable of being melted at temperatures no higher than about 1800° C., and which demonstrate annealing points of at least 850° C., linear coefficients of thermal expansion over the temperature range of 25°–300° C. of about 30–40×10$^{-7}$/°C., liquidus temperatures not exceeding about 1400° C., and liquidus viscosities of at least 100,000 poises. That study also indicates the generally unfavorable effects which the inclusion of MgO, CaO, ZnO, La$_2$O$_3$ and/or MnO can have upon the resulting glasses with respect to the above properties. In contrast, the addition of BaO can be useful in reducing the liquidus temperature without significantly affecting the viscosity of the glass, but care must be exercised in such additions because of volatilization of BaO and the development of seeds in the glass.

I claim:

1. A clear, transparent, homogeneous strontium aluminosilicate glass capable of being melted at temperatures no higher than about 1800° C. which exhibits an annealing point greater than 875° C., a linear coefficient of thermal expansion over the temperature range of 25°–300° C. of about 30–40×10$^{-7}$/°C., a liquidus temperature not exceeding about 1400° C., and a liquidus viscosity of at least 1×10$^5$ poises, said glass being essentially free from alkali metal oxide, MgO, CaO, ZnO, La$_2$O$_3$, and MnO, and consisting essentially, expressed in terms of mole percent on the oxide basis, of about 9–12% SrO,
9–12% Al$_2$O$_3$,
77–82% SiO$_2$.

2. A glass according to claim 1 wherein up to 8 mole percent BaO is substituted for SrO.

* * * * *